(12) United States Patent
Wittenberg

(10) Patent No.: US 6,889,123 B2
(45) Date of Patent: May 3, 2005

(54) SYSTEM AND METHOD FOR TARGET TRACKING AND NAVIGATION TO A TARGET

(75) Inventor: Peter S. Wittenberg, Creve Coeur, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/638,146

(22) Filed: Aug. 8, 2003

(65) Prior Publication Data

US 2005/0033488 A1 Feb. 10, 2005

(51) Int. Cl.⁷ .............................. G05D 1/00
(52) U.S. Cl. ............................. 701/3; 701/1
(58) Field of Search ........................... 701/3, 11, 200, 701/218, 225; 244/135 A, 161, 162; 342/23, 29, 31, 46–49

(56) References Cited

U.S. PATENT DOCUMENTS 5,128,873 A * 7/1992 Gilmour et al. ............ 701/218
6,542,109 B2 * 4/2003 Lloyd et al. ................. 342/14
2003/0136874 A1 * 7/2003 Gjerdrum ..................... 244/10

* cited by examiner

Primary Examiner—Yonel Beaulieu
(74) Attorney, Agent, or Firm—Black Lowe & Graham PLLC

(57) ABSTRACT

A system, method and computer program product for performing automatic navigation of a first aircraft to a second aircraft is provided. The system includes a radar system, a processor, memory, and a flight control system. The radar system generates a one-dimensional radar profile of the second aircraft. The processor determines flight information of the second aircraft based on the generated one-dimensional radar profile and one-dimensional radar profiles stored in the memory. The flight control system automatically directs the first aircraft based on the determined flight information of the second aircraft. In one embodiment, the first aircraft is an unmanned airborne vehicle and the second aircraft is a tanker aircraft. In another embodiment, the radar system may include a high-range resolution radar.

22 Claims, 4 Drawing Sheets

SYSTEM AND METHOD FOR TARGET TRACKING AND NAVIGATION TO A TARGET

GOVERNMENT LICENSE RIGHTS

This invention was made with Government support under U.S. Government contract no. F33615-00-D-3052 awarded by the Automatic Aerial Refueling (AAR) program from AFRL. The Government has certain rights in this invention.

FIELD OF THE INVENTION

This invention relates generally to radar systems and, more specifically, to navigation with respect to radar targets.

BACKGROUND OF THE INVENTION

Unmanned Combat Air Vehicles (UCAVS) are starting to be used by militaries for increasing the effectiveness and survivability of manned aircraft while lowering the overall cost of combat operations. UCAVs are projected to cost up to 50% less than traditional fighter aircraft and up to 50% less to operate and maintain. UCAVs include stealth technologies and carry precision-guided weapons, such as joint direct attack munition (JDAM) or small diameter bombs for performing suppression of enemy air defense missions. The UCAVs will preferably be preprogrammed to operate autonomously while being monitored by remote controllers located away from the battle zone. Mission parameters for UCAVs can be revised on route, either autonomously by the UCAVs or by the controllers. The UCAVs mission is complete upon payload delivery or expiration of fuel load whichever comes first. However, because of the fuel limitation, UCAVs cannot stay on station as long as desired. Some manned aircraft have the ability to refuel in flight, thereby extending their range and time on station.

Therefore, there exists an unmet need to extend UCAVs range and in-flight operation time.

SUMMARY OF THE INVENTION

The present invention provides a system, method and computer program product for performing automatic navigation of a first aircraft to a second aircraft. In one embodiment, a system includes a radar system, a processor, memory, and a flight control system. The radar system generates a one-dimensional radar profile of the second aircraft. The processor determines flight information of the second aircraft based on the generated one-dimensional radar profile and one-dimensional radar profiles stored in the memory. The flight control system automatically directs the first aircraft to the second based on the determines flight information of the second aircraft.

In one aspect of the invention, the first aircraft is an unmanned airborne vehicle and the second aircraft is a tanker aircraft.

In another aspect of the invention, the system includes a communication component that communicates with a remote mission control station.

In a further aspect of the invention, a multi-application data link antenna is coupled to the communication component and the radar system.

In still another aspect of the invention, the radar system includes a high-range resolution radar (1-D radar profile).

BRIEF DESCRIPTION OF THE DRAWINGS

The preferred and alternative embodiments of the present invention are described in detail below with reference to the following drawings.

DETAILED DESCRIPTION OF THE INVENTION

The present invention is directed to a low-cost automated radar-based flight control system and method for automatically maneuvering an aircraft relative to another aircraft. Many specific details of certain embodiments of the invention are set forth in the following description and in FIGS. 1–4 to provide a thorough understanding of such embodiments. One skilled in the art, however, will understand that the present invention may have additional embodiments, or that the present invention may be practiced without several of the details described in the following description.

Figure 1:
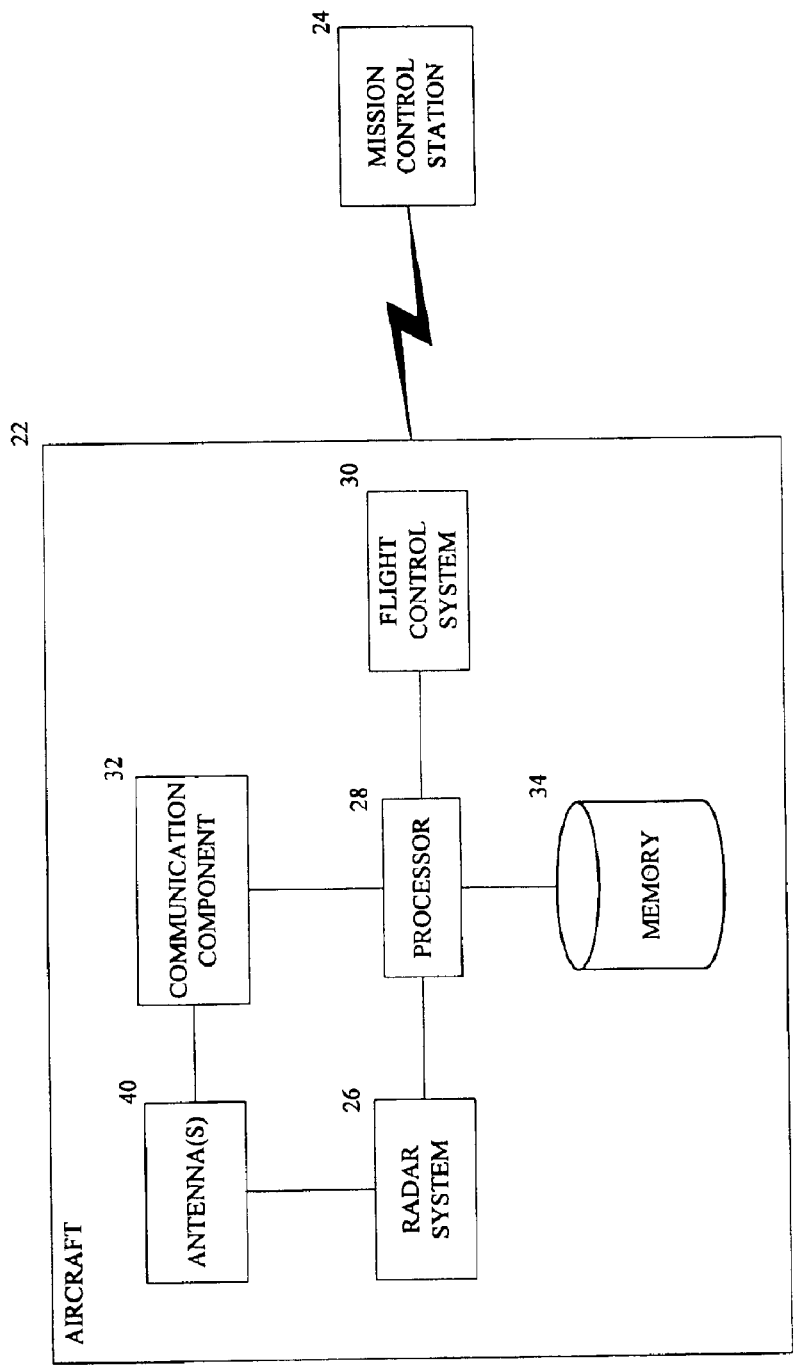
FIG. 1 is a block diagram of components of an exemplary system formed in accordance with an embodiment of the present invention.

Referring to FIG. 1, a system 20 formed in accordance with an embodiment of the present invention includes an aircraft 22 and optionally a mission control station 24 that is in wireless data communication with the aircraft 22. Non-limiting examples of the aircraft 22 include an unmanned (combat) airborne vehicle or a manned aircraft. The aircraft 22 includes a radar system 26, a processor 28, a flight control system 30, a communication component 32, memory 34, and one or more antennas 40. The processor 28 is coupled to the radar system 26, the flight control system 30, the communication component 32, and the memory 34. The radar system 26 and the communication component 32 are coupled to the one or more antenna 40. The processor 28 provides navigation information to the flight control system 30 based on information received from the radar system 26, the communication component 32, and the memory 34. The communication component 32 receives information from the mission control station 24 via the antenna 40. The radar system 26 transmits a radar signal via the antenna 40 and receives a return radar signal via the antenna 40. The return radar signal is processed by the radar system 26 and sent to the processor 28 for further processing.

In one embodiment, the radar system 26 is a high range resolution (HRR) radar system and the one or more antennas 40 are a single antenna that allows both data communication between the communication component 32 and the mission control station 24 and radar transmission and reception. The HRR radar system may provide a lower cost radar solution as compared to monopulse type radar systems. One example of a dual-purpose antenna 40 is a multi application data link (MADL) antenna, such as that produced by the Harris Corporation.

The memory 34 includes a plurality of radar profiles for various aircraft. The plurality of radar profiles are taken at predefined intervals, such as 3° intervals in aspect azimuth and elevation. In one embodiment of the invention, the system 20 is implemented in an Unmanned Airborne Vehicle (UAV) or an Unmanned Combat Air Vehicle (UCAV) and the radar profiles stored in the memory 34 include profiles of operational tanker aircraft, thus limiting the amount of data required to be stored in the memory 34.

Figure 2:
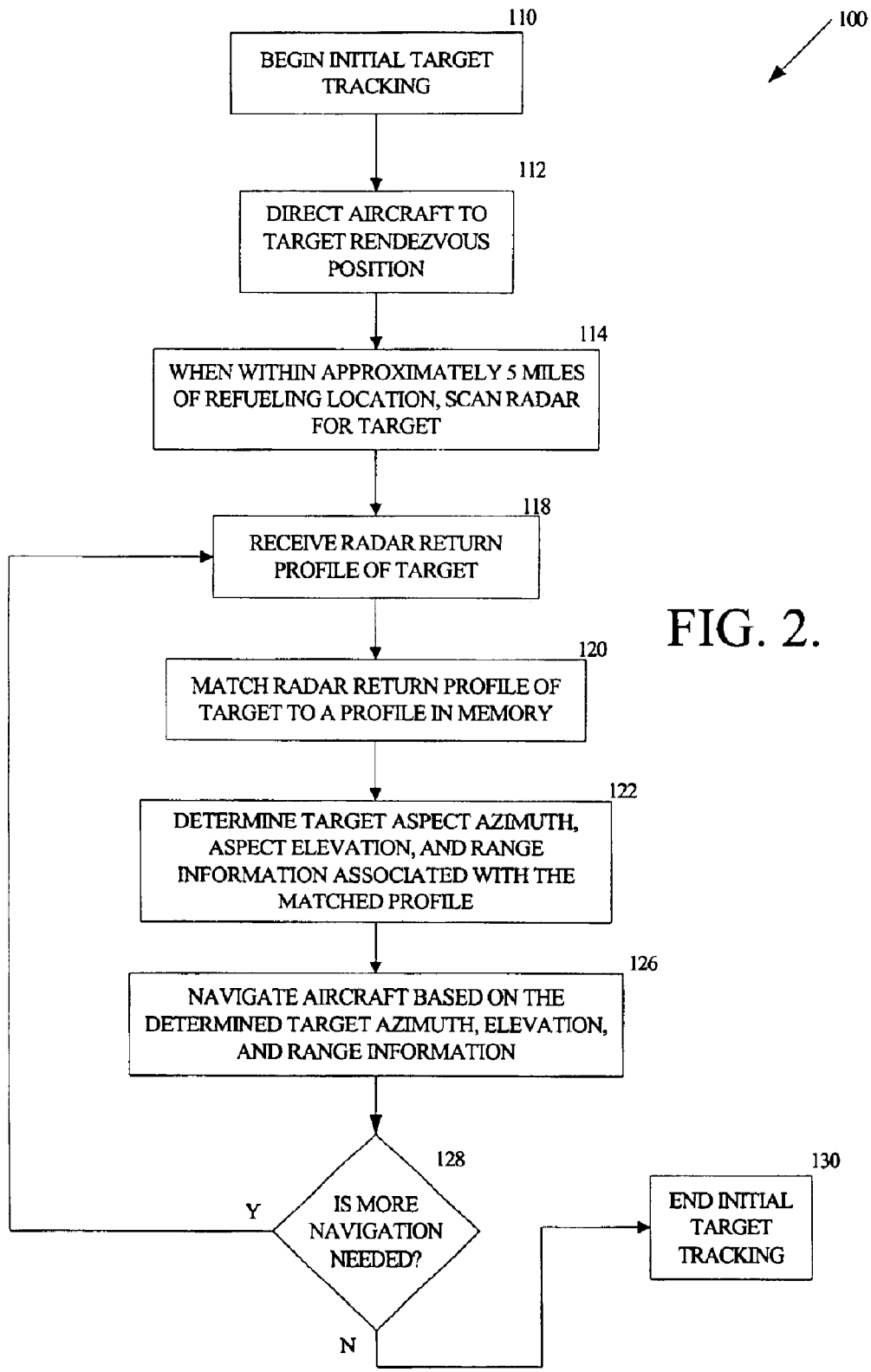
FIG. 2 illustrates a flow diagram of an exemplary process performed by the system shown in FIG. 1.

Referring to FIG. 2, in one embodiment the system 20 performs a process 100 for providing automatic navigation for one aircraft relative to another aircraft. At a block 110, initial target tracking begins. An example event used for target tracking to begin is air-to-air refueling. At a block 112, an aircraft is directed to a rendezvous location. In the case where the aircraft is a UAV and the UAV does not include a preplanned mission requiring auto navigation, the mission control station 24 or an airborne mission platform may transmit information of refueling location to the UAV. The transmission of the information from the mission control station 24 to the UAV can be a direct communication or via a third party, such as another aircraft or a satellite. At a block 114, the radar begins scanning for the target upon approaching the outer limit of the radar's capabilities. In one embodiment, if a HRR radar system is used, the radar begins scanning for the target upon approaching the outer limit of the radar's capabilities. In one embodiment, if a HRR radar system is used, the radar begins scanning at approximately 5 miles from the rendezvous location. At a block 118, the radar receives return profile information of the target. At a block 120, the processor 28 matches the received return profile of the target to a profile stored in the memory 34. At a block 122, target aspect azimuth, elevation, and range information are determined based on the matching. Target aspect azimuth is the direction of the target relative to the UAV. At a block 126, the flight control system 30 navigates the aircraft based on the determined target aspect azimuth, elevation, and range information. Because the flight control system 30 knows where the target is and the target's direction of travel (azimuth), target navigation is possible. At a decision block 128, if it is determined that more navigation is needed, the process 100 returns to a block 118 for updating radar information of the target and navigating accordingly. If no more navigation is needed at the decision block 128, then initial target tracking is complete at a block 130.

Figure 3:
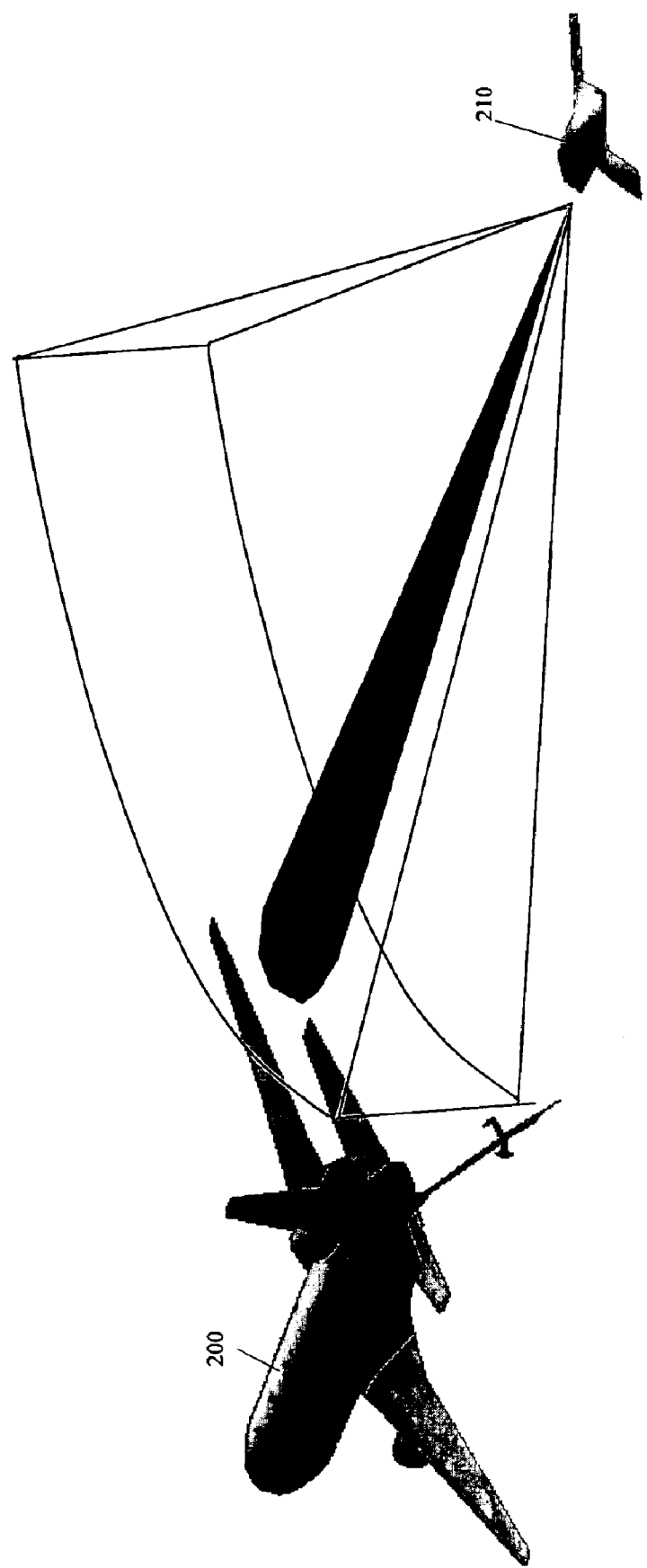
FIG. 3 illustrates a perspective view of an unmanned airborne vehicle setting up for refueling with a refueling tanker.

Referring to FIG. 3, a target aircraft 200 is a KC-10 tanker aircraft and the aircraft performing automatic tracking and navigation to the aircraft 200 is an Unmanned Combat Airborne Vehicle (UCAV) 210. The UCAV 210 suitably includes a low-power radar system (e.g. an HRR radar system) that can adequately receive profile information of the target aircraft 200 at a maximum range of approximately 5 miles.

Figure 4:
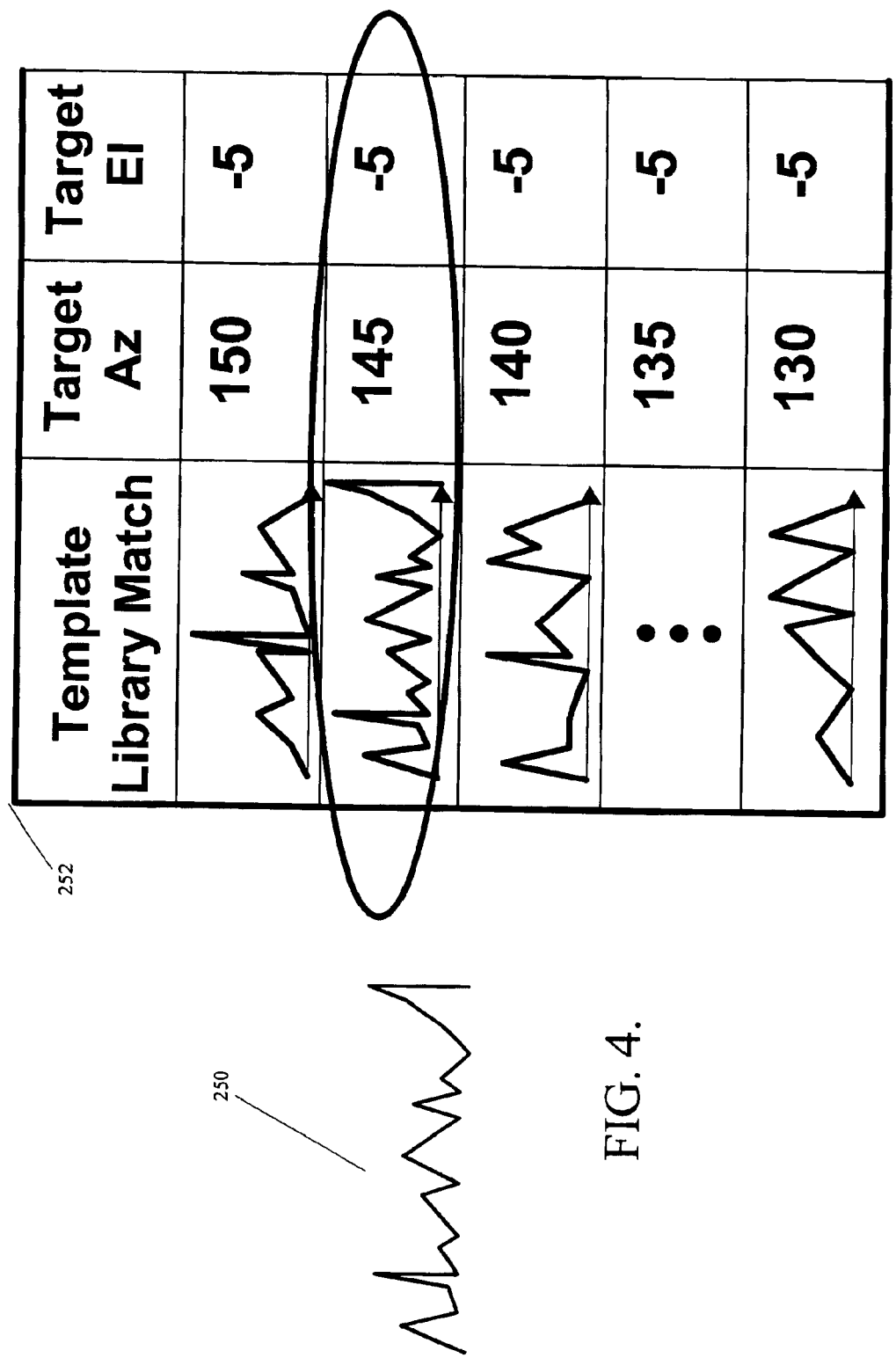
FIG. 4 illustrates a radar profile matching that is performed by the system shown in FIG. 1.

In one embodiment as shown in FIG. 4, the radar system 26 creates a standard one-dimensional HRR profile 250 of target energy as a function of time. The created HRR profile 250 is compared to a table 252 of one-dimensional HRR profile templates that are stored in the memory 34. In one embodiment, the processor 28 compares the signal 250 to the other radar profiles of the table 252 by performing a root mean squared comparison of data within predefined range bins. Once the processor 28 has found a profile match, associated target aspect azimuth and elevation values are retrieved from the table 252. The retrieved target aspect azimuth and elevation information are then sent to the flight control system 30. The flight control system 30 navigates according to the target aspect azimuth and elevation information as well as range information included within the profile 250.

The HRR profile templates may be created by sweeping a radar beam about a target and determining the angle at which the greatest power is returned.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A system for performing automatic navigation of a first aircraft to a second aircraft, the system comprising:
   a radar system configured to generate a one-dimensional radar profile of the second aircraft;
   a processor configured to determine flight information of the second aircraft based on the generated one-dimensional radar profile; and
   a flight control system configured to automatically direct the first aircraft based on the determined flight information of the second aircraft.

2. The system of claim 1, wherein the first aircraft is an unmanned airborne vehicle.

3. The system of claim 2, wherein the second aircraft is a tanker aircraft.

4. The system of claim 1, further comprising:
   a communication component configured to communicate with a remote mission control station.

5. The system of claim 4, further comprising an antenna coupled to the communication component and the radar system.

6. The system of claim 5, wherein the antenna is a multi-application data link antenna.

7. The system of claim 1, wherein the radar system includes a high-range resolution radar.

8. The system of claim 1, further comprising a memory configured to store a plurality of one-dimensional radar profiles with associated azimuth and elevation information, wherein the processor determines flight information of the second aircraft by matching the generated one-dimensional radar profile to one of the plurality of one-dimensional radar profiles and retrieving the azimuth and elevation information associated with the matched radar profile.

9. A method for performing automatic navigation of a first aircraft to a second aircraft, the method comprising:
   generating a one-dimensional radar profile of the second aircraft;
   determining flight information of the second aircraft based on the generated one-dimensional radar profile; and
   automatically directing the first aircraft based on the determined flight information of the second aircraft.

10. The method of claim 9, wherein the first aircraft is an unmanned airborne vehicle.

11. The method of claim 10, wherein the second aircraft is a tanker aircraft.

12. The method of claim 9, further comprising communicating with a remote mission control station.

13. The method of claim 12, wherein communicating and generating a one-dimensional radar profile are performed on a dual-use antenna.

14. The method of claim 13, wherein the dual-use antenna is a multi-application data link antenna.

15. The method of claim 9, wherein generating a one-dimensional radar profile is a performed by a high-range resolution radar.

16. The method of claim 9, further comprising:
   storing a plurality of one-dimensional radar profiles with associated azimuth and elevation information,
   wherein determining flight information of the second aircraft includes:
      matching the generated one-dimensional radar profile to one of the stored plurality of one-dimensional radar profiles; and retrieving the azimuth and elevation information associated with the matched one-dimensional radar profile.

17. A computer program product residing on a computer-readable medium for performing automatic navigation of a first aircraft to a second aircraft, the computer program product comprising:

means configured to generate a one-dimensional radar profile of the second aircraft;

means configured to determine flight information of the second aircraft based on the generated one-dimensional radar profile; and means configured to automatically direct the first aircraft based on the determined flight information of the second aircraft.

18. The computer program product of claim 17, wherein the first aircraft is an unmanned airborne vehicle.

19. The computer program product of claim 18, wherein the second aircraft is a tanker aircraft.

20. The computer program product of claim 17, further comprising means configured to communicate with a remote mission control station.

21. The computer program product of claim 17, wherein means configured to generate the one-dimensional radar profile generates the one-dimensional radar profile with a high-range resolution radar.

22. The computer program product of claim 17, further comprising:

means configured to store a plurality of one-dimensional radar profiles with associated aspect azimuth and elevation information, wherein the means configured to determine flight information of the second aircraft includes:

means configured to match the generated one-dimensional radar profile to one of the stored plurality of one-dimensional radar profiles; and means configured to retrieve the aspect azimuth and elevation information associated with the matched one-dimensional radar profile.

* * * * *